US007106331B2

(12) United States Patent
Gurushankar et al.

(10) Patent No.: US 7,106,331 B2
(45) Date of Patent: Sep. 12, 2006

(54) BI-DIRECTIONAL PROPAGATION IN A CURVE NETWORK

(75) Inventors: Aditya N. Gurushankar, Huntsville, AL (US); Daniel C. Staples, Madison, AL (US); Joseph J. Bohman, Cypress, CA (US); Prasad Pingali, Madison, AL (US); Ganapathy S. Kunda, Huntsville, AL (US); Navinchandra Pai, Madison, AL (US)

(73) Assignee: UGS Corp., Plano, TX (US)

( * ) Notice: Subject to any disclaimer, the term of this patent is extended or adjusted under 35 U.S.C. 154(b) by 380 days.

(21) Appl. No.: 10/382,358

(22) Filed: Mar. 5, 2003

(65) Prior Publication Data

US 2004/0174383 A1    Sep. 9, 2004

(51) Int. Cl.
    *G06T 11/20*    (2006.01)
(52) U.S. Cl. ........................... 345/442; 345/441
(58) Field of Classification Search ............... 345/441, 345/442
    See application file for complete search history.

(56) References Cited

U.S. PATENT DOCUMENTS

| 5,754,181 | A | 5/1998 | Amdursky et al. |
| 5,757,678 | A | 5/1998 | Leeke |
| 5,894,310 | A | 4/1999 | Arsenault et al. |
| 6,392,645 | B1 | 5/2002 | Han et al. |
| 6,559,860 | B1 * | 5/2003 | Hamilton et al. ........... 345/700 |
| 6,670,961 | B1 * | 12/2003 | Dhimitri et al. ........... 345/619 |

OTHER PUBLICATIONS

Short W. et al., "Interaction with Constraints In 3D Modeling" Proceedings, Symposium on Solid Modeling Foundations and CAD/CAM Applications, Jun. 5, 1991, pp. 387-396, XP002231158, Abstract, Chapters 5.1, 6, Figures 15-18.
Chung J. C. H. et al., "Framework for Integrated Mechanical Design Automation" Computer Aided Design, Elsevier Publishers BV., Barking, GB, vol. 32, No. 5-6, May 2000, pp. 355-365, XP004194683. ISSN: 0010-4485. Chapters 2. 3. 4. Figures 2. 5. 6.
Anonymous: "Ashlar-Vellum: Cobalt, Xenon & Argon: Designer Elements—3D Modeling User Guide", Jan. 2003, Ashlar-Vellum Inc., XP002289089, Retrieved from the Internet:URLhttp://www.ashlar.com/support/3d_modeling_gs_v6.pdf>, retrieved onJul. 19, 2004.

* cited by examiner

*Primary Examiner*—Richard Hjerpe
*Assistant Examiner*—Blake Betz
(74) *Attorney, Agent, or Firm*—Davis Munck, P.C.

(57) ABSTRACT

A system, method, and computer program product for performing edits on related curves by automatically defining an associative entity that is upstream of either curve being connected. The connecting entity is called an 'intermediary'. When creating a connection between curves, irrespective of where they appear in the associative tree, their geometry is made dependent on a common intermediary that is placed upstream of both curves in the tree. With this structure, both curves are related to the intermediary but retain all the properties of being connected to each other. Any edit performed to either curve is redirected through the intermediary such that both curves are simultaneously modified, providing the user with bi-directional propagation of edits. The user does not need to keep track of the order that the curves were related.

22 Claims, 3 Drawing Sheets

BI-DIRECTIONAL PROPAGATION IN A CURVE NETWORK

The present application has some Figures or specification text in common with, but is not necessarily otherwise related to, the following application(s):

TECHNICAL FIELD OF THE INVENTION

This invention relates in general to the area of computer graphics and in particular to the area of curve connection, editing and manipulation.

BACKGROUND OF THE INVENTION

The computer has greatly affected essentially all forms of information management, including the graphical editing and computer aided design and drafting (CAD) tools. Some simpler geometric modeling computer program products are two dimensional, providing only length and width dimensions of objects, while more complex and powerful computer program products provide three dimensional editing and visualization.

Three dimensional geometric modeling programs can generate a scene or part which can comprise one or more constituent 3D solid shapes. For example, a scene featuring a simple table would comprise a solid shape for each leg of the table, as well as a solid shape for a flat table top. The geometric modeling computer program typically has an executable object used to define and generate each solid shape. The object for each solid shape can have several components, the components being a combination of executable code and data structure. For example, a boundary representation ("B-rep") component includes a data structure describing the geometry and topology data for the solid shape (e.g., length, width, depth, and coordinates of the solid part).

Most three dimensional geometric modeling programs employ a feature-based parametric modeling technique. In feature-based parametric modeling, the executable object for each solid shape has not only a boundary representation component, but also a history or creation component, referred to herein as a "feature tree," which includes a data structure reflecting how a solid shape has been created. That is, the feature tree includes data which indicates an order or chronological sequence of steps employed to construct the solid shape. For a simple solid block, for example, the history may indicate that the solid block began as a simple two dimensional rectangle that was extruded into a third dimension. U.S. Pat. No. 5,894,310, incorporated herein by reference, discloses solid shapes having various other components in addition to boundary representation and historical components: a visual component; a physical component; a functional component; and a behavioral component. Similarly, U.S. Pat. No. 6,392,645, incorporated herein by reference, describes a method of converting between a feature-based data structure and a direct-face data structure in graphical modeling.

Typically, when the user wants to modify a feature-based solid shape by changing any aspect of the solid shape, the feature-based parametric modeling technique re-evaluates the entire solid shape, e.g., goes through the entire CGS feature tree in order to revise the part in accordance with the change. For example, if the user wanted to lengthen the table top of the table described above, another solid shape would be added adjacent to the previous table top. In so adding another solid shape corresponding to the increased length of the table top, another step is added to the CSG history. Alternatively, the user may modify the 2D profile of the table top and let the program to re-evaluate the solid shape of the table.

Construction of surfaces involves setting up networks of connected curves that are interpolated by the surfaces. The surface shape is manipulated by modifying the surface or, in some systems, the underlying curves.

There are three major approaches to editing curve networks in existing solutions:

In an associative modeling system, curves are created sequentially, with curves occurring later in the model referencing geometry from curves earlier in the model. Associative relationships update the curves, ensuring geometric connectivity when upstream curves are changed. The order in which the curves are related is implicitly defined by their position in the associative tree. The curves higher up in the tree drive the downstream curves. An upstream curve cannot be edited by connecting to a downstream curve, as that would create associative dependency loops. Typically, to prevent users from creating dependency loops, the software will automatically hide downstream geometry during editing of upstream curves, resulting in the user losing the context of his changes.

In some associative modeling systems, curves are grouped into curve networks that have local relationships. The relation of the curve network to entities outside of the group is similar to the above behavior. Though curves within a network can be simultaneously edited, there are similar limitations when relating to geometry outside the curve network.

In non-associative systems, the curves in a model have no explicit or implicit ordering. The curves do not have any relationships to each other but for their geometric connectivity. Curves are connected by snapping the geometry to significant points on other curves without creating relationships. Editing of a curve does not automatically update connected curves, resulting in adjacent curves disconnecting. All curves have to be individually modified to ensure geometric connectivity.

There is, therefore, a need in the art for an improved system and method for editing curve networks in associative modeling systems.

SUMMARY OF THE INVENTION

To address the above-discussed deficiencies of the prior art, it is a primary object of the present invention to provide an improved system, method, and computer program product for graphical editing in a data processing system.

The preferred embodiment provides a system, method, and computer program product for performing edits on related curves by automatically defining an associative entity that is upstream of either curve being connected. The connecting entity is called an 'intermediary'. When creating a connection between curves, irrespective of where they appear in the associative tree, their geometry is made dependent on a common intermediary that is placed upstream of both curves in the tree. With this structure, both curves are related to the intermediary but retain all the properties of being connected to each other. Any edit performed to either curve is redirected through the intermediary such that both curves are simultaneously modified, providing the user with bi-directional propagation of edits. The user does not need to keep track of the order that the curves were related.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art will appreciate that they may readily use the conception and the specific embodiment disclosed as a basis for modifying or designing other structures for carrying out the same purposes of the present invention. Those skilled in the art will also realize that such equivalent constructions do not depart from the spirit and scope of the invention in its broadest form.

Before undertaking the DETAILED DESCRIPTION OF THE INVENTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

Figure 1:
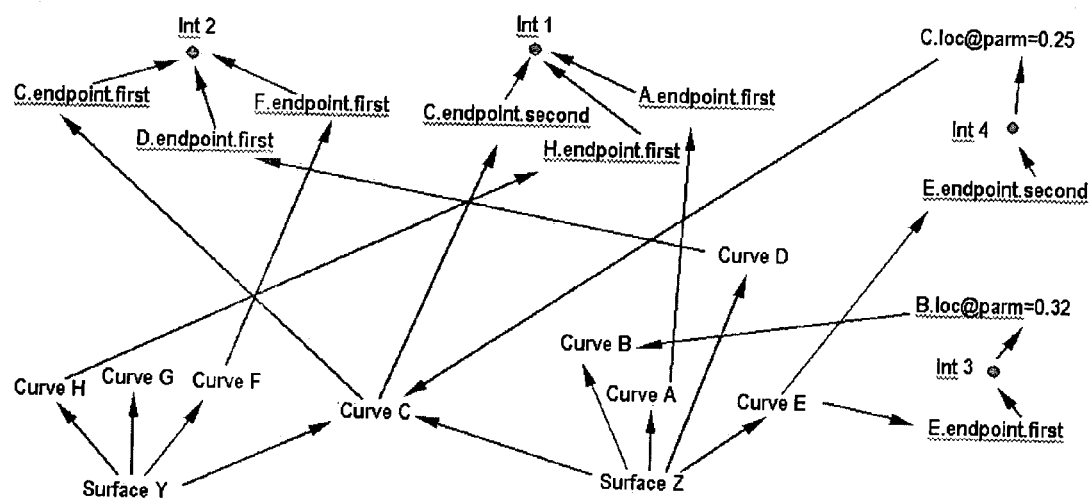
FIG. 1 depicts an exemplary curve dependency network in accordance with a preferred embodiment.
Figure 2:
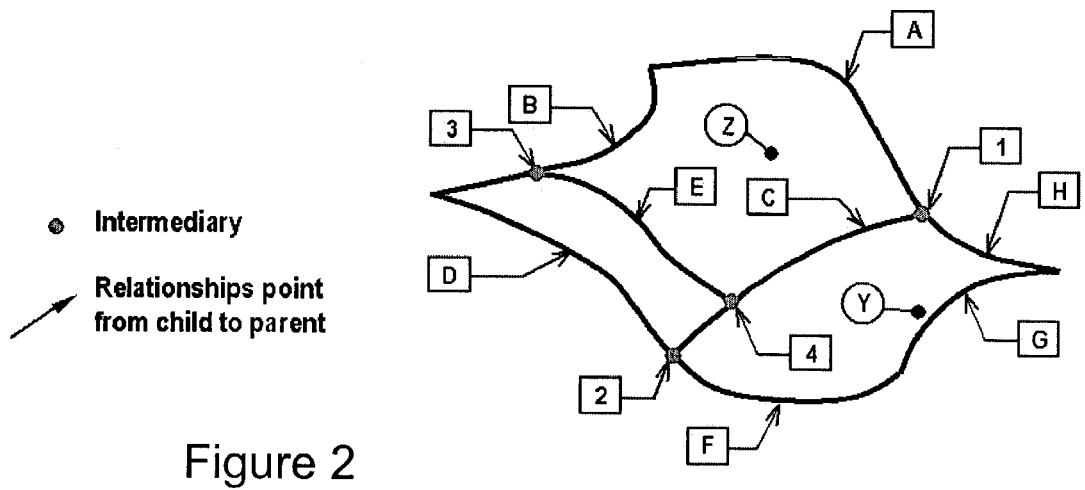
FIG. 2 depicts an exemplary curve and surface graphic in accordance with a preferred embodiment.
Figure 3:
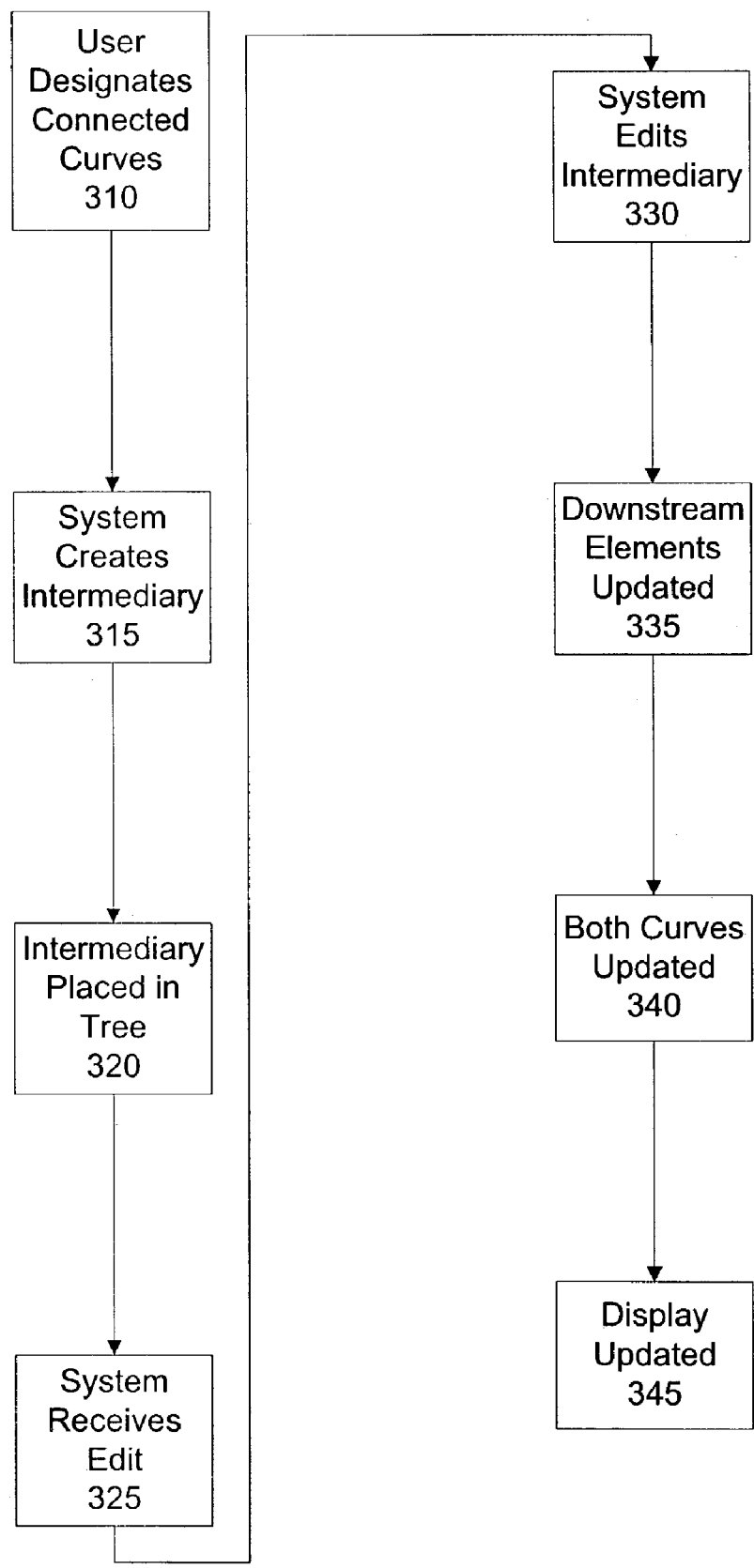
FIG. 3 depicts a flowchart of a process in accordance with a preferred embodiment.

FIGS. 1 through 3, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged device. The numerous innovative teachings of the present application will be described with particular reference to the presently preferred embodiment.

In this document, it is assumed that the reader is of skill in the art, and is familiar with common terms and acronyms as used in the art. In particular, it is noted that a feature tree contains sequential lists of features, states, or events relating to a graphical element or elements. As used in this document, "upstream" refers to features, states, or events which have a chronologically earlier position in the feature tree, and "downstream" refers to features, states, or events which have a chronologically later position in the feature tree. Further, the "dependent tree" refers to the tree of features, states, or events which are downstream in the feature tree, as later events are naturally dependent on earlier events.

The preferred embodiment provides a system, method, and computer program product for performing edits on related curves by automatically defining an associative entity that is upstream of either curve being connected. The connecting entity is called an "intermediary." When creating a connection between curves, irrespective of where they appear in the associative tree, their geometry is made dependent on a common intermediary that is placed upstream of both curves in the tree. With this structure, both curves are related to the intermediary but retain all the properties of being connected to each other. Any edit performed to either curve is redirected through the intermediary such that both curves are simultaneously modified, providing the user with bi-directional propagation of edits. The user does not need to keep track of the order that the curves were related.

Further, the intermediaries update in an intelligent manner when a set of connected curves are updated. All the intermediaries that are involved with the set of curves are solved simultaneously to ensure that curve properties (such as planarity, rigidity and shape edit behavior) are retained. Solving the intermediaries simultaneously ensures that the curves will all remain connected when any edit is performed. Note that this can be a complex and interdependent process when planar curves are involved and the user desires to keep their planarity. In this case, special solutions must be found that allow the plane positions to "float" to achieve a solution that is desirable given the constraints.

The concept of bi-directional propagation can be extended from the preferred positional connectivity to higher order relationships such as tangent, perpendicular and curvature continuity. The intermediary in such cases will provide appropriate editable properties that all related curves will react to. For example, the tangent intermediary will provide a 'direction' property that connected curves will use to maintain mutual tangency. Any modification of the end orientation of one of the curves will modify the direction of the intermediary. When all related curves update, they will have maintained the tangency property.

FIG. 1 shows relationships between points on exemplary curves; FIG. 2 shows the exemplary curves and surface corresponding to the points of FIG. 1. FIGS. 1 and 2 should be referenced together in the following example:

In FIG. 1, four intermediaries (Int 1 thru Int 4) connect a set of six curves. The arrows describe the directed relationships from surfaces to curves to the intermediaries. When the user edits the endpoint of a curve, say A.endpoint.first, the system of the preferred embodiment will actually perform all positional changes on Int 1. The change in Int 1 will propagate to C.endpoint.second and H.endpoint.first. Similarly, the user can modify either C.endpoint.second or H.endpoint.first based on his design edit context, and all curves at Int 1 will stay connected.

An intermediary can derive its position from a relationship. Int 3 is defined as being at parameter 0.32 on curve B. In this case, Int 3 only drives the end of curve E.

The preferred embodiment achieves its advantages while continuing to use an associative, history-based framework.

The curves being connected continue to retain their positions in the history tree. For example, when two curves, at different points in the history tree, are connected, they are made dependent on a common entity, called 'intermediary', so that they will interpolate the intermediary. The intermediary occurs earlier than either curve in the associative graph.

By interpolating the common intermediary, it is ensured that the curves will remain connected to each other. Positional edits to the connected curves are not made directly; rather, the intermediary is modified. During associative update, both curves continue to interpolate the intermediary's spatial position and appear to remain connected to each other.

In this way, a practical bidirectional curve editing technique is achieved. According to the preferred embodiments, bidirectionality is derived by indirection to the common intermediary. Intermediaries are only modified either by user editing a curve or as part of a solve that modifies a group of related intermediaries to move in a desired fashion. The above restriction means that the intermediary will not change during an update of the dependent curves and thus prevents cyclic dependency.

For example, the user can edit a curve that occurs later in history than the curve to which it is connected. Changing the downstream curve will modify the intermediary's position and the upstream curve will update interpolate the intermediary. In effect, it will remain connected to the downstream curve being modified.

FIG. 3 shows a flowchart of a process in accordance with the preferred embodiment. In this example, it is assumed that a user is working within a graphic editing system in which a plurality of curves have already been defined, as these steps are within the knowledge of those of skill in the art.

According to this process, the user first operates the graphic system to designate a point at which two existing curves are connected (step 310). The user can also designate multiple initial points on the curves to connect. In this case, each curve is associated with a common associative history tree. Note that this selection can also be performed with an automated system.

In response to the user's designation, the system will create an intermediary (step 315), which is placed in to the associative history tree at a point upstream of either of the selected curves (step 320).

Thereafter, the system can receive edits initiated manually by the user (step 325), or automatic edits from other processes.

When the edit of one curve is received, the system treats this as an edit of the intermediary, and edits the intermediary instead (step 330). When this occurs, the change will update all of the downstream elements in the history tree (step 335). As such, both connected curves are updated (step 340).

As the edit can be performed on either connected curve, and thereby will update both curves, this has the practical effect of enabling bidirectional propagation of curve edits in the history tree.

Those skilled in the art will recognize that, for simplicity and clarity, the full structure and operation of all data processing systems suitable for use with the present invention is not being depicted or described herein. Instead, only so much of a data processing system as is unique to the present invention or necessary for an understanding of the present invention is depicted and described. The remainder of the construction and operation of data processing system 100 may conform to any of the various current implementations and practices known in the art.

It is important to note that while the present invention has been described in the context of a fully functional system, those skilled in the art will appreciate that at least portions of the mechanism of the present invention are capable of being distributed in the form of a instructions contained within a machine usable medium in any of a variety of forms, and that the present invention applies equally regardless of the particular type of instruction or signal bearing medium utilized to actually carry out the distribution. Examples of machine usable mediums include: nonvolatile, hard-coded type mediums such as read only memories (ROMs) or erasable, electrically programmable read only memories (EEPROMs), user-recordable type mediums such as floppy disks, hard disk drives and compact disk read only memories (CD-ROMs) or digital versatile disks (DVDs), and transmission type mediums such as digital and analog communication links.

Although an exemplary embodiment of the present invention has been described in detail, those skilled in the art will understand that various changes, substitutions, variations, and improvements of the invention disclosed herein may be made without departing from the spirit and scope of the invention in its broadest form.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC §112 unless the exact words "means for" are followed by a participle.

What is claimed is:

1. A method for performing graphic edits, comprising:
   receiving a selection of a first curve and a second curve, said first and second curves each associated with an associative history tree;
   creating an intermediary corresponding to the first and second curves;
   inserting the intermediary in the associative history tree at a location upstream of the first and second curves;
   when either the first curve or the second curve is edited, then performing corresponding edits of the intermediary; and
   updating the first and second curves to interpolate the intermediary.

2. The method of claim 1, further comprising receiving an instruction to edit the first curve, and editing the intermediary.

3. The method of claim 1, further comprising, after the intermediary is edited, then updating the associative history tree.

4. The method of claim 1, wherein the first and second curves form a graphical surface.

5. The method of claim 1, wherein the intermediary is edited automatically in response to an edit of the first or second curves.

6. The method of claim 1, further comprising receiving user input for the selection of the first and second curves.

7. The method of claim 1, further comprising displaying, to a user, an image corresponding to the first and second curves.

8. A data processing system having at least a processor and accessible memory, comprising:

means for receiving a selection of a first curve and a second curve, said first and second curves each associated with an associative history tree;

means for creating an intermediary corresponding to the first and second curves;

means for inserting the intermediary in the associative history tree at a location upstream of the first and second curves; and means for, when the intermediary is edited, performing corresponding edits of the first and second curves.

9. The data processing system of claim 8, further comprising means for receiving an instruction to edit the first curve, and editing the interniediary.

10. The data processing system of claim 8, further comprising means for updating the associative history tree after the intermediary is edited.

11. The data processing system of claim 8, wherein the first and second curves form a graphical surface.

12. The data processing system of claim 8, wherein the intennediary is edited automatically in response to an edit of the first or second curves.

13. The data processing system of claim 8, further comprising means for receiving user input for the selection of the first and second curves.

14. The data processing system of claim 8, further comprising means for displaying, to a user, an image corresponding to the first and second curves.

15. A computer program product tangibly embodied in a computer-readable medium and executed on a computer, comprising:

instructions for receiving a selection of a first curve and a second curve, said first and second curves each associated with an associative history tree;

instructions for creating an intermediary corresponding to the first and second curves;

instructions for inserting the intermediary in the associative history tree at a location upstream of the first and second curves; and instructions for, when the intermediary is edited, performing corresponding edits of the first and second curves.

16. The computer program product of claim 15, further comprising instructions for receiving an instruction to edit the first curve, and editing the intermediary.

17. The computer program product of claim 15, further comprising instructions for updating the associative history tree after the intermediary is edited.

18. The computer program product of claim 15, wherein the first and second curves form a graphical surface.

19. The computer program product of claim 15, wherein the intermediary is edited automatically in response to an edit of the first or second curves.

20. The computer program product of claim 15, further comprising instructions for receiving user input for the selection of the first and second curves.

21. The computer program product of claim 15, further comprising instructions for displaying, to a user, an image corresponding to the first and second curves.

22. A method for performing graphic edits, comprising:

receiving a selection of a first curve and a second curve, the first and second curves each associated with an associative history tree, the second curve occurring after the first curve in the associative history tree;

creating an association between the first and second curves; and when the second is edited, performing corresponding edits of the first curve.

* * * * *